United States Patent [19]

Wing

[11] 4,109,391

[45] Aug. 29, 1978

[54] PORTABLE SURVEYING COMPASS WITH FLUX VALVE AND GYROCOMPASS ALIGNMENT MODES

[75] Inventor: Willis G. Wing, Glen Head, N.Y.

[73] Assignee: Sperry Rand Corporation, New York, N.Y.

[21] Appl. No.: 758,292

[22] Filed: Jan. 10, 1977

[51] Int. Cl.² .......... G01C 19/38; G01C 1/02
[52] U.S. Cl. .................. 33/275 G; 33/327; 33/354
[58] Field of Search .......... 33/327, 323, 319, 354, 33/317 R, 317 D, 275, 275 G

[56] References Cited

U.S. PATENT DOCUMENTS

| | | | |
|---|---|---|---|
| 3,162,951 | 12/1964 | Hintze et al. | 33/327 X |
| 3,452,443 | 7/1969 | Arthur | 33/327 |
| 3,780,444 | 12/1973 | Taylor | 33/327 |
| 3,837,086 | 9/1974 | James | 33/317 D |
| 3,858,328 | 1/1975 | La Rose | 33/319 |
| 3,921,305 | 11/1975 | King, Jr. et al. | 33/317R |
| 3,967,384 | 7/1976 | Swartz et al. | 33/317 R |

*Primary Examiner*—William D. Martin, Jr.
*Attorney, Agent, or Firm*—Howard P. Terry

[57] ABSTRACT

A miniature automatically self-aligning azimuth reference employs a floated pendulous gyrocompass device for the rapid determination of geographic north as required for surveying purposes. Fast approximate alignment with north from an initially misaligned condition is effected, while the gyroscope rotor is being run up to speed, using flux valve control. The control is then shifted to a gyrocompassing mode including settling, integration, and driving steps which complete precise alignment.

15 Claims, 11 Drawing Figures

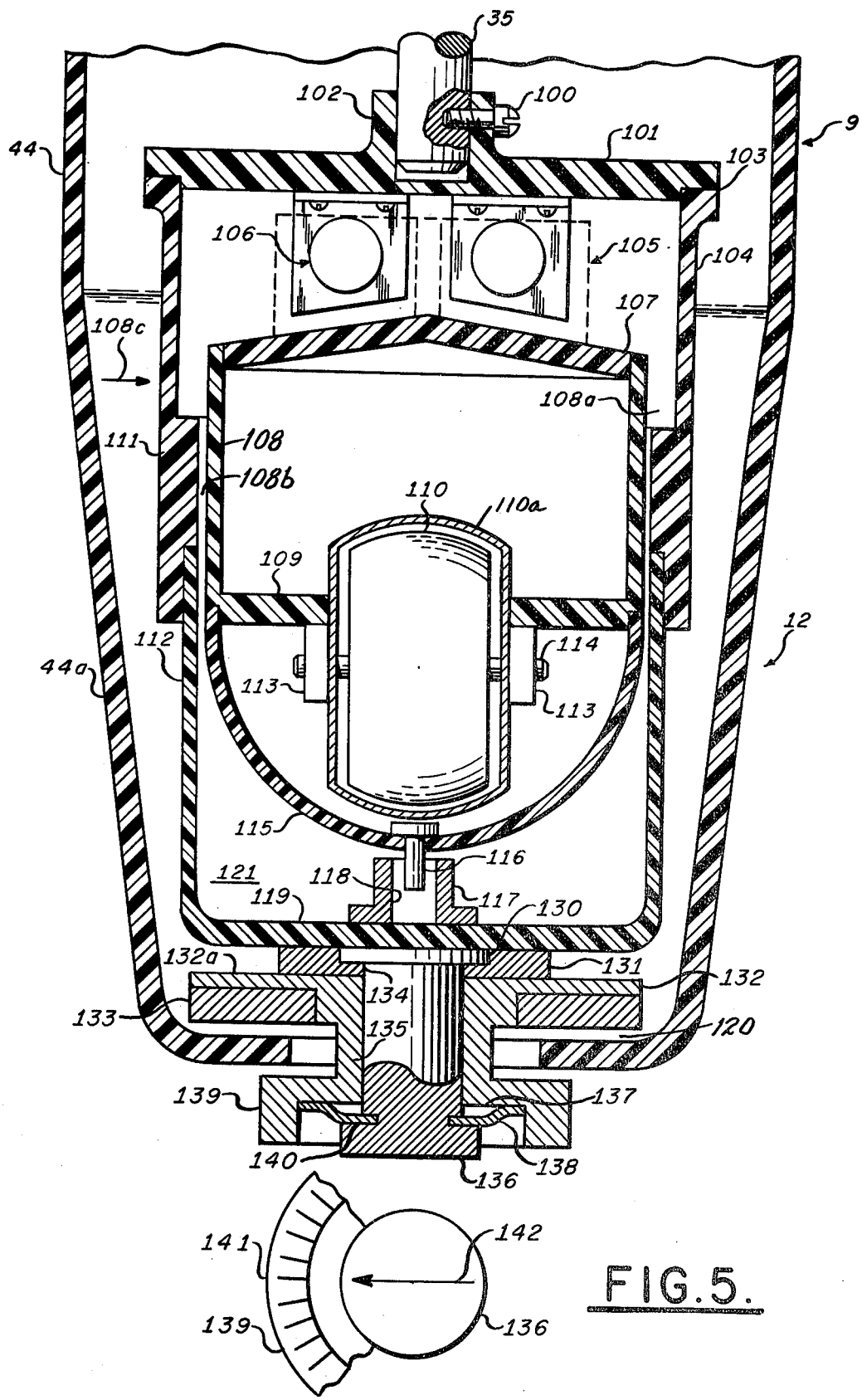

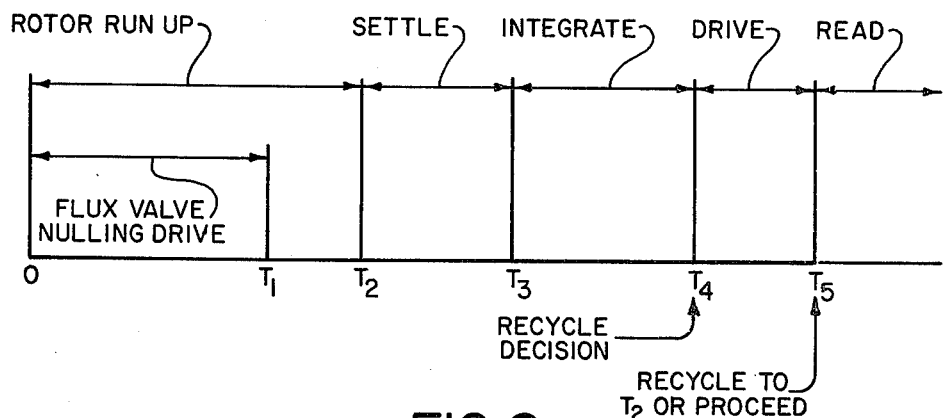
FIG.8
| MODE | SWITCH POSITION | | | |
|---|---|---|---|---|
| | S₁ | S₂ | S₃ | S₄ |
| F.V. NULLING | TERM. 231 | CLOSED | TERM. 236 | CLOSED |
| ROTOR RUN UP | TERM. 231 | CLOSED | TERM. 236 | OPEN AFTER F.V. NULLING |
| SETTLE | TERM. 231 | CLOSED | TERM. 237 | OPEN |
| INTEGRATE | TERM. 231 | OPEN | TERM. 237 | OPEN |
| DRIVE | TERM. 232 | OPEN | TERM. 237 | CLOSED |
| READ | TERM. 231 | CLOSED | TERM. 237 | OPEN |
FIG.9
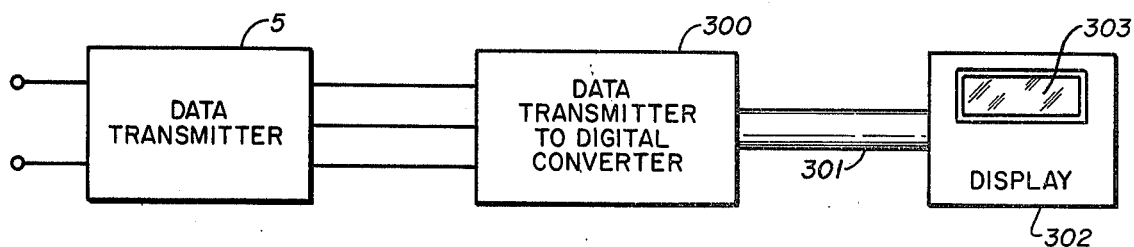
FIG.11

PORTABLE SURVEYING COMPASS WITH FLUX VALVE AND GYROCOMPASS ALIGNMENT MODES

BACKGROUND OF THE INVENTION

1. Field of the Invention

The invention relates to portable gyroscopic compass devices of the kind adapted for surveying purposes and more particularly relates to portable gyrocompass surveying devices including means for rapidly aligning the reference device with respect to geographic north.

2. Description of the Prior Art

The accuracy of prior art gyrocompass devices and their capability of rapid alignment with the northly direction has been discussed, for example, in the W. G. Wing U.S. Pat. application Ser. No. 621,907, filed Oct. 14, 1975, entitled "Portable Surveying Gyrocompass Apparatus," and assigned to Sperry Rand Corporation, which application discloses an improvement over the prior art affording greatly enhanced rapid alignment and accuracy capabilities. The present invention represents a significant improvement over the apparatus of the prior Wing application which issued as U.S. Pat. No. 4,033,045 July 5, 1977.

It is the objective of the prior Wing application to provide a miniature automatically self-aligning azimuth reference that employs a floated pendulous gyrocompass device for the rapid determination of geographic north. Fast alignment with north from an initially misaligned condition is effected in an iterative manner by a vertical axis magnetic torquer-pick off system cooperating with a dual servo loop control for the rapid orientation of the system.

The floated sensitive element is pendulous, permitting the azimuth motion of the float to be controlled by the vertical axis torquer rather than by a horizontal axis torquer. The torque supplied by the vertical axis torquer is proportional to the rate of rotation of the floated sensitive element about the horizontal axis normal to the spin axis; thus, under the condition that there is no rotation of the sensitive element about this axis with respect to the vertical, the applied torque is a measure of the spin axis angle departure from north and is used in the determination of the drive angle required to reduce the northerly pointing error. The combination of elements is enclosed in a follow-up housing, servo driven about the vertical axis. The follow-up housing is successively driven in azimuth during the north-finding operation so as to become the reference for the measurement of bearing angles with respect to geographical north.

The prior Wing invention retains important advantages of its prior art while offering significant additional advantages; it retains the advantages of total absence of mechanical or electrical connections to the floated sensitive element for providing high accuracy and floatation in a free-surface liquid in a self-compensating arrangement requiring no temperature or related controls. Settling on geographic north is greatly improved as to accuracy and the time required to achieve settling. A relatively crude initial north alignment is acceptable, and local latitude does not have to be precisely known. Because the basic operation of the system is automatic, the operator needs little skill and can be trained in a short time to achieve accurate results.

SUMMARY OF THE INVENTION

The present invention is the consequence of an effort to retain the essential features and good operating characteristics of the novel device of the prior Wing application, while additionally achieving even greater speed of alignment of the surveying compass along with further improved accuracy. Instruments used economically in commercial surveying of mines of tunnels, for example, must lend themselves to rapid employment to be fully competitive. Instruments for target locating and artillary aiming must often be used in difficult environments and must similarly be capable of rapidly yielding accurate survey data.

It will be apparent that, if the initial pointing direction of the instrument is very nearly correct, the time required to achieve final alignment is greatly reduced. For example, consider the instance of the prior Wing apparatus, wherein the angle away from north is measured and a servo drive through the measured angle is then made to reduce that error angle substantially to zero. For large initial error angles, a successive series of measurements and drives is required. On the other hand, if the initial error angle is small, a single measurement and drive event would be sufficient to achieve accurate alignment.

According to the present invention, the rough initial alignment with respect to north is obtained by use of a flux valve cooperating with the gyrocompass in an initial mode. When properly corrected for local magnetic variation, the flux valve data is sufficiently accurate for the rapid achievement of rough alignment with only a minor increase in complexity of the apparatus; furthermore, the flux valve control according to the invention provides the rough alignment during the period ordinarily employed only to drive the gyroscope rotor up to normal operating speed, thus additionally decreasing operation time.

Advantageously, local magnetic variation can be set in by the operator based on prior knowledge of the earth's field of the local geographical area taken from printed tables. On the other hand, the novel apparatus has the further advantage that it can obtain its own measure of local magnetic variation; that requires very simply that a run be made in which the entire operation depends on the gyrocompass mode and the difference between the approximate north obtained in this manner and north as indicated by the flux valve is taken as the local magnetic variation. Evidently, this self-determination of magnetic variation must be done for a particular geographic area at a time when the relatively long operating cycle required is acceptable. Once an accurate value of magnetic variation has been obtained for the particular geographic area, a reasonable determination of true north can be obtained in a few seconds by use of the flux valve 133 along. The accuracy of such a determination is frequently accurate without the need to wait for a gyrocompassing operation.

It will be appreciated that the instrument may be employed in a variety of surveying applications. For example, in addition to being operated in cooperation with a conventional surveying telescope or a theodolite, it may be used with optical or other range finders and the like.

BRIEF DESCRIPTION OF THE DRAWINGS

FIG. 3 is an elevation view in partial cross section of the gyrocompass section of FIG. 1.

FIG. 5 is a fragmentary view of a portion of FIG. 3 seen when looking upward toward the bottom of the flux valve adjustment device.

FIG. 8 is a timing chart and FIG. 9 is a table useful in explaining the programmed operation of the apparatus of FIG. 7.

FIG. 11 is a wiring diagram of apparatus for the operation of the display of FIG. 1.

DESCRIPTION OF THE PREFERRED EMBODIMENTS

General

Figure 1:
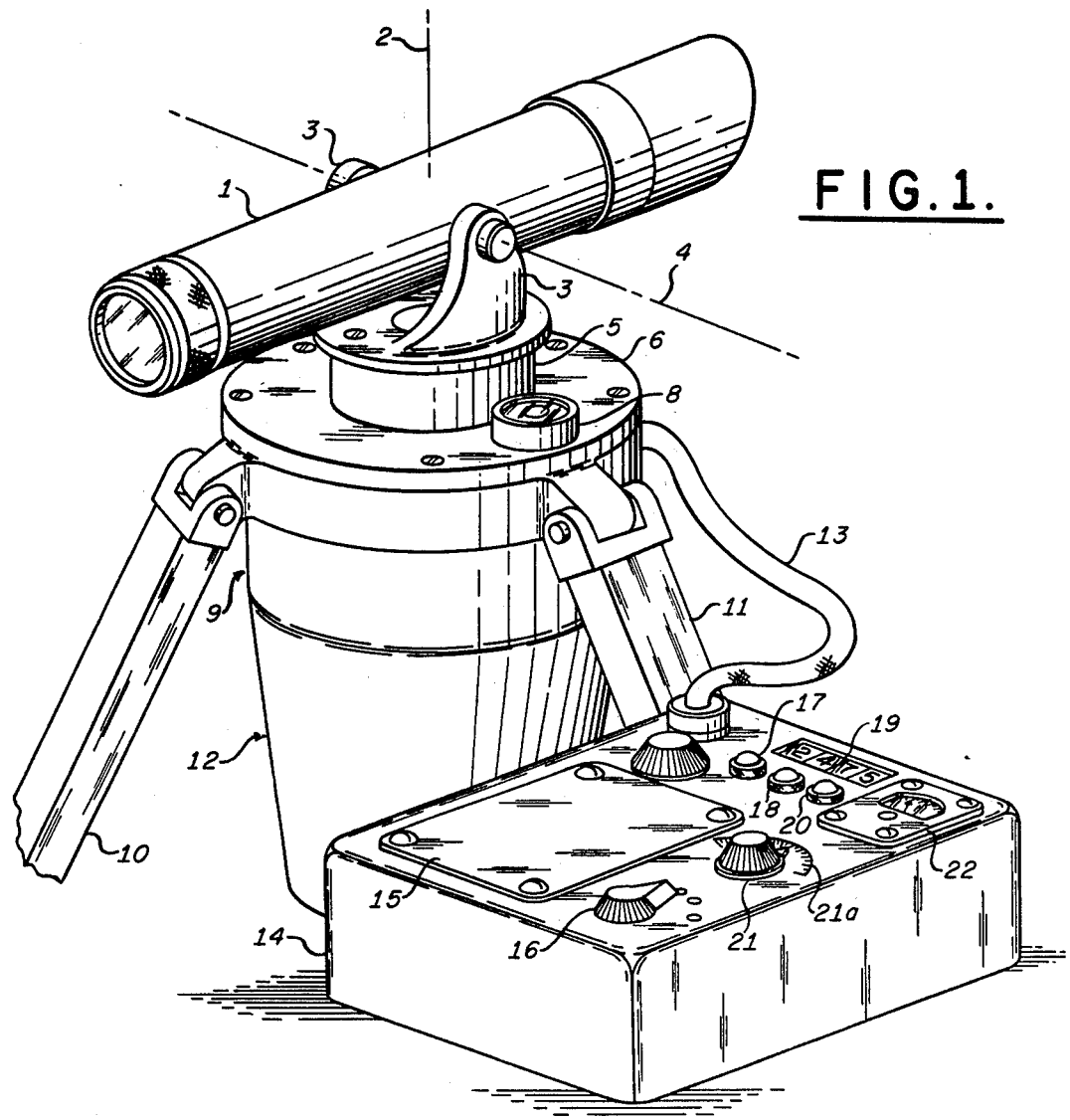
FIG. 1 is a perspective view of the apparatus of the invention as it is employed in the field.

FIG. 1 illustrates one form of the novel apparatus, showing its general appearance when set up for use in the field. It includes a conventional telescope 1 or other sighting or surveying device, journaled about a generally horizontal axis 4 and about a generally vertical axis 2, the telescope being mounted in a pair of opposed supports 3 seen more completely in FIG. 2. The supports 3 are affixed to a top portion of a data transmitter section 5 which remains to be discussed particularly with respect to FIG. 2. The data transmitter section 5 is supported about a circular mounting plate 6 to which adjustable length, adjustable angle tripod legs, such as legs 10 and 11, are attached in the conventional manner often used in ordinary surveying instruments. Suspended from mounting plate 6 is a control section 9 having, in its interior, control elements of the invention shown in more detail in FIG. 2. Pending from the casing of control section 9 is a continuation thereof indicated at 12, section 12 including gyroscopic apparatus further to be discussed in connection with FIG. 3.

Control of the apparatus and display of data generated thereby are supplied mainly by the operator's control chassis 14. Generally, the apparatus is battery operated, so that chassis 14 is equipped with an access door 15 so that batteries may be supplied and replaced. A mode switch determining operation of the apparatus is provided at 16, this switch permitting actuation of the apparatus, charging of internal batteries, or operation from internal batteries or from an external power source. The condition of the internal battery may be indicated on a conventional electrical meter 22. Local latitude is set into the apparatus manually by potentiometer 21 and index 21a, as will be explained. Several situation display lights may be provided, light 17 indicating that the apparatus has been turned on, light 18 indicating that it is ready for actual use, and light 20 providing malfunction or misalignment indications, for instance. After an appropriate time interval, the desired azimuth reading is provided by numerical display 19. The circular mounting plate 6 of the instrument is provided with a bubble level 8 for enabling the operator initially to level plate 6 by adjustment of tripod legs 10, 11 in the usual manner. As will be explained, certain signals generated within sections 5, 9, and 12 of the apparatus of FIG. 1 are supplied by a multi-lead electrical cable 13 to chassis 14. Other signals and operating power may be supplied through the same cable 13 from chassis 14 to the gyroscopic surveying instrument.

THE DATA TRANSMITTER SECTION

Figure 2:
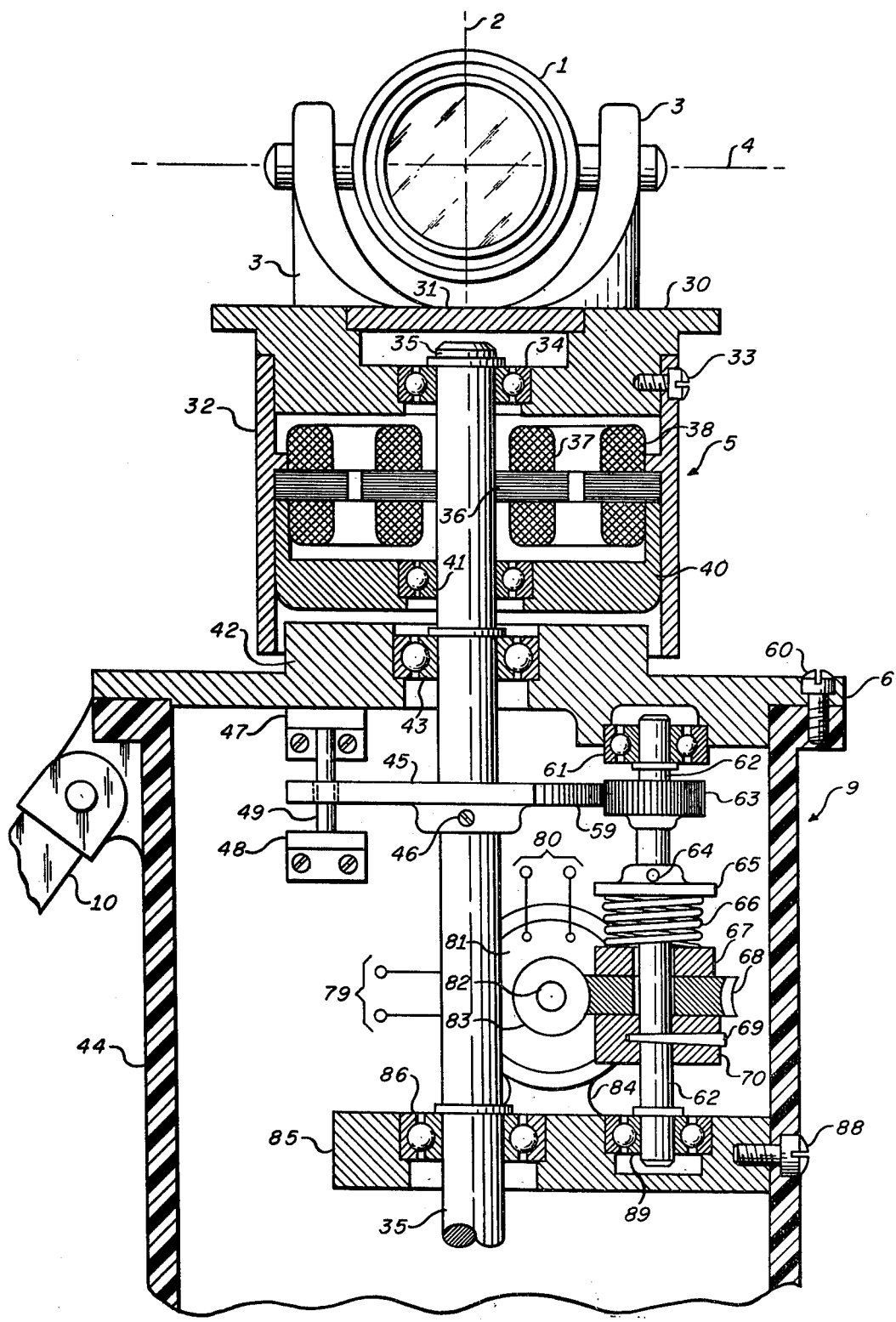
FIG. 2 is an elevation view in partial cross section of telescope, data transmitter, and control sections of FIG. 1.

Referring now particularly to FIG. 2, telescope 1 is journaled about horizontal axis 4 and is supported by support elements 3, 3 above an upper plate 30 of data transmitter section 5, plate 30 having a central aperture protected by access cover 31. From plate 30, there extends downwardly a cylindrical shell 32 affixed to upper plate 30 by conventional fasteners 33. Upper mounting plate 30 and cylindrical shell 32 form part of a casing for data transmitter section 5 which includes therein a shaft 35 supporting a movable part of a selsyn or other data transmitter of conventional type. Shaft 35 is concerned with the performance of several primary functions of the apparatus, since it cooperates with the transmitter of data transmitter section 5 and with the control elements of control section 9, and since it furthermore, as will be seen in FIG. 3, supplies support for the gyroscopic elements of the invention.

Control section 9 of the apparatus has an apertured upper disk-shaped mounting plate 6 which supports a centrally located ball bearing 43 in which shaft 35 is rotatable. Shaft 35 is additionally supported by a ball bearing 86 also within the control section 9, as will be further described. It is thus supported for free rotation so that it may, in turn, support a rotor of data transmission system 5 for rotation about vertical axis 2. For this purpose, upper plate 30 of data transmission section 5 is provided with an aperture wherein is supported one part of a ball bearing 34 whose second part is mounted on the upper end of shaft 35. Part of the data transmitter is supported by cup-shaped member 40, also forming a lower portion of the casing for section 5. Cup-shaped element 40 has a central aperture and is supported for free rotation on shaft 35 by a ball bearing 41. In this manner, the rotor of the data transmission section 5 and telescope 1 may be manually rotated in azimuth by the operator.

Means are provided for the electrical measurement of the angle between shaft 35 and the bore-sight of telescope 1 within data transmission section 5. This measurement means includes a selsyn or other conventional data transmitter lying between the upper plate 30 and cup-shaped member 40. The conventional magnetic structure 36 of one mechanically independent section of the selsyn is affixed to shaft 35 and rotates therewith along with an annular selsyn coil 37. The second portion of the selsyn, relatively rotatable with respect to the first section thereof, is clamped by cup-shaped element 40 within cylindrical shell 32. For example, the magnetic circuit 39 of this second portion of the selsyn is clamped by cup-shaped element 40 against an annular flange on the internal surface of shell 32. The annular magnetic circuit 39 and the annular selsyn coil 38 supported thereby are thus evidently rotatable with respect to shaft 35, and are moved when the operator rotates telescope 1 in azimuth

The Control Section

As in the aforegoing discussion of FIG. 1, the control section 9 of FIG. 2 is supplied with a cylindrical shell or outer casing 44 pending from mounting plate 6 and fastened thereto by conventional fasteners 60. Control section 9 includes an extension of shaft 35 that passes into the apparatus of FIG. 3 for support of the gyroscopic apparatus. As mentioned in the foregoing material, shaft 35 is mechanically supported within control section 9, this support being accomplished in part by the ball bearing 43 residing in a suitable aperture in mounting plate 6. Further support is provided in the lower portion of FIG. 2 by a shelf plate 85 affixed to the interior surface of external shell casing 44 by conventional fasteners 88. An aperture provided at a central location in shelf plate 85 contains the ball bearing 86 mounted concentrically on shaft 35 for providing the second bearing support of shaft 35.

Figure 4:
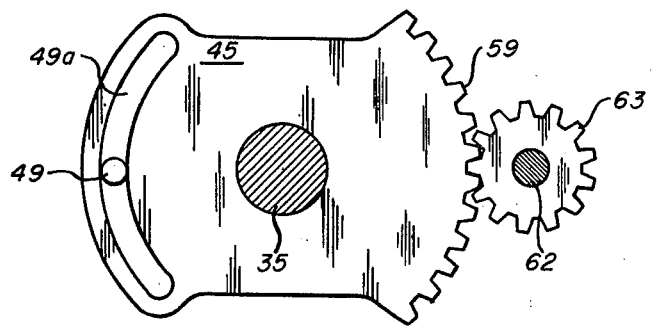
FIG. 4 is a plan view of a portion of the apparatus within the control section of FIG. 2.

As is seen in FIGS. 2 and 4, shaft 35 supports a stop arrangement and sector gear for engagement with a pinion gear 63, the sector gear and stop arrangement being supported by a hub affixed to shaft 35 by screw 46. On one arcuate side of the device are teeth forming a sector gear 59 which mesh with pinion gear 63; on the opposite side of the device, there is provided an arcuate slot 49a. A stop member in the form of a vertical rod 49 extends through arcuate slot 49a, rod 49 being supported by brackets 47, 48 from casing 44. Since the center of the arcs forming slot 49a coincides with the center of rotation of shaft 35, the sector gear arrangement is free to rotate to a limited angular extent.

As noted, sector gear 59 meshes with pinion gear 63; pinion 63 is affixed to a vertical shaft 62 supported by the respective ball bearings 61 and 89 suitably mounted within apertures of mounting plate 6 and shelf plate 85. Shaft 62 and, therefore, sector gear 59 are rotated when motor 81 is energized by the supply of appropriate command signals to the motor leads 80. For this purpose, shaft 82 of motor 81 is supplied with a worm gear 83 for driving the cooperating gear 68, thus rotating shaft 62. So that motor 81 will not stall when stop 49 reaches one of its extreme positions, a slip clutch is provided between gear 68 and shaft 62. The illustrated slip clutch includes a face plate 70 pinned at 69 with respect to shaft 62. Gear 68 is not directly affixed to shaft 62 but, without the effects of elements now to be described, is free to rotate thereon. Above gear 68 is a second face plate 67 also freely mounted on shaft 62. Finally, there is provided a collar 65 fastened at 64 to shaft 62 and having a face plate surface for compressing helical spring 66 against the upper surface of face plate 67. In this manner, and as in conventional practice, gear 68 and shaft 62 normally rotate together. However, when the mechanical limit stop is reached, shaft 62 stops rotating and gear 68 no longer drives shaft 62. A conventional rate generator or tachometer (not shown in FIG. 2) is supplied on shaft 82 behind the case of motor 81 and provides a rate signal output on leads 79, as will be further described.

The Gyrocompass Section

As previously noted, shaft 35 extends into the gyrocompass section 12 of FIG. 3 and supports a generally cylindrical sealed container assembly having mating shell portions 104 and 112 closed by a bottom end 119 for containing the floated gyrocompass assembly. In particular, the upper cover plate 101 of this sealed follow-up assembly is fastened to the lower end of shaft 35 in a suitable manner, as by machine screw 100 and the cooperating hub 102. The upper cylindrical container portion 104 of the follow-up assembly is fastened by any conventional means at 103 to plate 101 and extends downwardly in the external casing 44, which element 44 may be in the shaft of a truncated conical shell supplied at its lower end with an apertured plate 120.

Within the follow-up container portion 104 and the downward extension 112 thereof is contained a gyrocompass assembly floated in a suitable gyroscope floatation fluid filling the interior of follow-up container portions 104, 112 to the level indicated at 108c. The floatation element enclosing the gyroscope includes a top portion 107 in the shape of a shallow cone, the upper surface of cone 107 supporting the electrically active elements of an electromagnetic pick-off 105 and of an electromagnetic torquer 106. These elements may be individual conventional devices of well known nature for measuring the error in position of cone 107 and therefore of shell 108 with respect to shaft 35 and container 104, 112 and a conventional torquer device for reducing that error to zero. While the integrated pick-off and torquer device of the aforementioned U.S. Pat. application Ser. No. 621,907 may be employed in the present invention, the exact nature of the pick-off and torquer elements is not particular to the present invention. Conventional means (not shown) for centering shell 108 within container 104, 112 may also be supplied, if desired, but the exact nature of such means again forms no particular part of the present invention. Affixed to the conical cover plate 107 of the floatation element and forming a sealed part of it is a downwardly extending thin-walled shell 108 of generally cylindrical character within which is formed a normally horizontal support platform 109. The floatation element is completed by a thin-walled symmetric hemispherical shell 115 affixed to the cylindrical shell 108 at platform 109.

An annular reentrant portion 111 of the follow-up casing 104 projects inwardly towards cylindrical shell 108 so that a smaller annular gap 108b is provided between elements 108 and 111. Since the interior of container portions 104, 112 is supplied with floatation fluid up to level 108c, gap 108b also contains such fluid. A variety of known ways for conducting electrical power to drive the gyroscope rotor 110 is available, including flexible leads. These being well understood in the art, no particular scheme is illustrated herein for the sake of providing uncomplicated drawings. However, it will be clear to those skilled in the art that a plurality of electrically conducting electrodes may be supplied in the opposed electrically insulating surfaces forming gap 108b so that when an electrically conducting floatation fluid is employed, electrical power may be supplied from the operator's chassis 14 across gap 108b for driving the gyroscope rotor without imposing restraining torques on the sensitive element. It will be observed that the narrow gap 108b is ended slightly below the normal level 108c of the floatation fluid. This eliminates any adverse torquing effects which would be present because of surface tension effects within an extension of narrow gap 108b. To supply the fluid needed to fill the widened portion 108a of the gap, a relatively large reservoir 121 is formed below the floated assembly.

An aperture of platform 109 permits installation of the gyrocompass sensitive element indicated in a general manner in FIG. 3 as including at least a gyroscope rotor 110 journaled on a shaft 114 within yokes 113 supported by platform 109, shaft 114 normally lying during operation of the system substantially in a horizontal plane. Surrounding the sensitive element rotor is a magnetic shield 110a shown as generally conformal with respect to gyroscope 110. Shield 110a is beneficial in view of the close proximity to the gyroscope motor of the sensitive flux valve 133, whose function remains to be discussed. Though the shield configuration illustrated will be generally found suitable, a completely spherical shield element is known to be superior in respect to torques produced by external magnetic fields and may readily be substituted.

Rough centering and caging during transportation of the floatation element is aided by use of a centrally placed stop affixed on the bottom end 119 of follow-up container portion 112. The stop consists of a tube 117 affixed to the inner surface of end 119 and having a cylindrical bore 118 loosely accommodating a pin 116 projecting downwardly from a central location in hemisphere 115 into bore 118.

The sensitive floated gyrocompass assembly is neutrally buoyed in the hermetically sealed floated shell consisting principally of the conical top part 107, the thin-walled cylindric shell 108, and the hemispherical shell 115 which each may be constructed of a light-weight material such as a glass-reenforced epoxy molded plastic. The sealed shell may be filled with an atmosphere of a mixture of gases including helium designed to reduce windage losses of gyroscope rotor 110 and to provide a cooling heat path from it to the exterior of the instrument. The weight of the floated sensitive assembly, including gyroscope 110, and the density of the floatation fluid in space 121 and gap 108b are selected so that the outer surface of conical top part 107 is normally above the free top surface of the fluid at level 108c. The shape and apex angle of cone 107 are conveniently arranged to prevent condensation from forming droplets that stay on the conical surface. In this manner, the latter surface is automatically cleared of any drops of fluid that might accumulate there, for example, during transportation of the instrument.

The pendulosity of the sensitive floated gyrocompass assembly is adjusted to a normal value by locating gyroscope rotor 110, in which is located the largest mass of the assembly, below the center of buoyancy of the fluid. Variation in temperature, causing the floatation fluid either to contract or to expand, simply causes the actually floated volume to vary in direct proportion to the change in fluid density; hence, the sensitive float assembly remains in a substantially constant position relative to the follow-up housing cover plate 101. There is thus created a balanced effect whereby the rise of the fluid level at 108c with increasing temperature substantially matches the drop in float projection above level 108c caused by the reduction of fluid density with rising temperature, and vice versa. The elevation of the sensitive floated assembly conical top 107 with respect to follow-up container top 101 therefore remains substantially constant over the operating temperature range of the instrument. Therefore, a perfect floatation is provided without the need of any temperature, fluid density, or float volume control. Accordingly, there is no relative vertical displacement of the sensitive float conical top 107 to cause undesirable mechanical disruption of the pick-off and torquer elements 105, 106.

The Flux Valve

The follow up element 104, 112 is supplied with a flux valve 133 responsive to the earth's magnetic field vector for determining the direction of that vector with respect to a reference direction associated with the follow up member. Also provided is a means for inserting, in effect, the magnetic deviation angle into the output of the flux valve for correction purposes. While flux valve 133 is shown in FIG. 3 located at the bottom 119 of follow-up element 104, 112, it is within the scope of the present invention that it be placed in other locations within the instrument.

In some locations within the instrument, a wie-shaped flux valve widely used in conventional airborne navigation systems is fully suitable. Such flux valves and systems employing them are described, for example, in the U.S. Pat. No. 2,383,461 for a "Flux Valve Compass System" to O. E. Esval et al, issued Aug. 28, 1945 and, in more recent form, in the D. J. Kesselring U.S. Pat. No. 3,573,610 for "Earth's Field-Sensitive Magnetometer for Use in Compass Systems Having Gradually Converging Flux Collectors and Being Insensitive to Varying Ambient Temperatures," issued Apr. 6, 1971, both patents being assigned to Sperry Rand Corporation. A single phase of the three phase output of such a flux valve may readily be used in the present invention.

Figure 6:
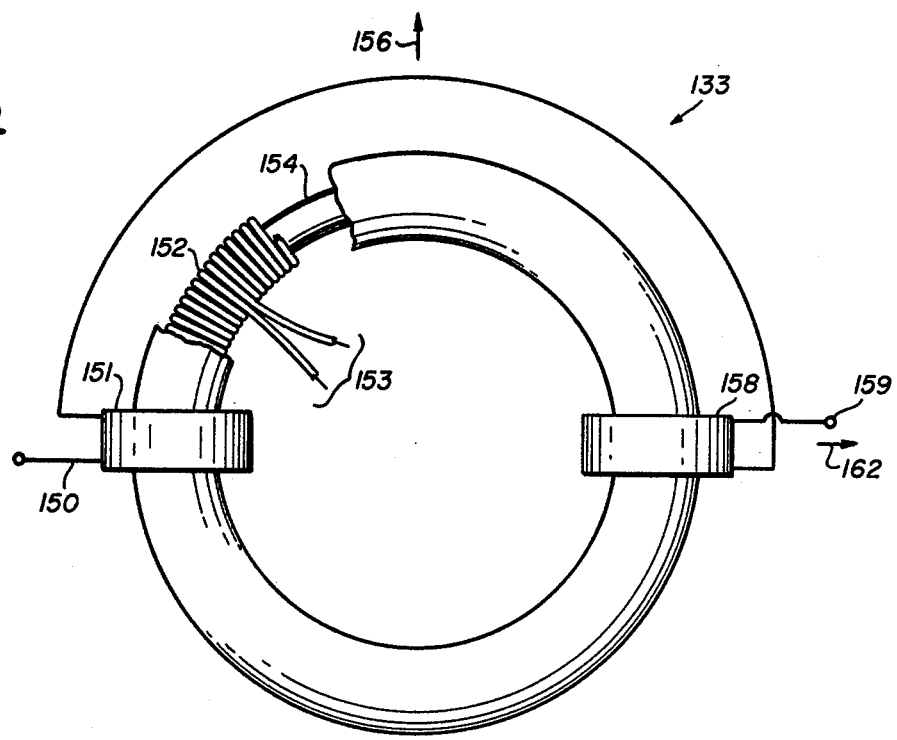
FIG. 6 is a plan view in partial cross section of a flux valve employed in the apparatus of FIG. 3.

In some locations in the novel instrument, it is convenient to mount the sensitive flux valve concentrically around a rotatable shaft or other axially located element, as in FIG. 3. For this purpose, an annular flux valve 133 of the kind illustrated in FIG. 6 is desirable. Such a flux valve includes a thin sheet toroidal core 154 of high magnetic permeability material on which is wound a continuous exciting winding 152 energized by alternating current coupled to leads 153 so as to be magnetically saturated twice per cycle. Also wound upon core 154 is a pair of pick-off coils 151, 158 disposed in diametric opposition. Coils 151, 158, are similar, having the same number of turns. Accordingly, voltages induced in coils 151, 158 by a periodically-varying exciting flux generated by excitation winding 152 are equal in magnitude in the absence of any earth's field excitation of core 154. Coils 151 and 158 are connected in series opposition, so that the resultant voltage at terminals 150, 159 is zero in the absence of an externally applied unidirectional magnetic field such as the earth's field.

If a unidirectional field is applied having a component in the direction of arrow 156, differential voltages induced in coils 151, 158 will have a frequency twice that of the frequency of the exciting flux and a phase corresponding to the sense of the applied unidirectional field along the direction of arrow 156. In other words, series connected coils 151, 158 produce a voltage at terminals 150, 159 varying sinusoidally with the angle between the direction of the unidirectional magnetic field and the orientation 162 of the plane of coils 151, 158. Flux valves yielding the outputs of the FIG. 6 device are well known in the art as advantageous because they do not become accidentally magnetized and are very thin; they are described, for example, in the U.S. Pat. No. 2,389,146 to C. F. Fragola et al, issued November 20, 1945 for a "Flux Valve" and assigned to Sperry Rand Corporation.

Referring to FIGS. 3 and 5, a suitable mounting for flux valve 133 is shown, along with an arrangement for rotating it for manual insertion of the local magnetic variation angle. For these purposes, a short shaft 136 is affixed to the base 119 of follow-up element 104, 112 at flange 130. Also affixed to base 119, in coaxial relation to shaft 136, is an apertured disc 131 of a conventional material and having a good friction face. The annular flux valve 133 is mounted for rotation about shaft 136 on cylindrical bearing surface 134 by virtue of the cooperating bearing sleeve 135, which latter may be integral with the flux valve supporting disc 132. Disc 132 has an upper face 132a coacting in the usual manner with friction disc 131, tending to hold disc 132 stationary with respect to plate 131. As seen more particularly in FIG. 5, an exterior enlarged flange portion 139 of sleeve 135 bears 360° angular indicia 141 on its outer surface, while an enlarged end portion of shaft 136 bears the positioned reference 142 of the follow-up device 104, 112. Captive in an annular groove 140 in the enlarged end 136 of sleeve 135 is an annular spring washer 138 applying force against an inner face 137 of portion 139. Spring washer 139 urges surfaces 132a against friction plate 131 just sufficient that there is normally no undesired motion therebetween, but is lax enough that the disc 132 and therefore flux valve 133 is manually turned with ease about the axis of shaft 136 when the operator grasps the enlarged portion 139 of sleeve 135.

It will be understood by those skilled in the art that flux valve 133 and its adjustment mechanism may be placed fully within casing 44a and that the compensating rotation of the flux valve may be made directly by a servo motor (not shown) geared to sleeve 135, for example, the servo motor position being controlled from the control chassis 14. The correction for local magnetic deviation may alternatively be set in by the use of a fixed flux valve 133, the variation being set in through the use of adjustable tap 242 of potentiometer 241 in FIG. 7, the potentiometer 241 being calibrated in angular degrees and being supplied with regulated positive and negative voltage at terminals 240a and 240b. According to this arrangement, tap 242 is adjusted and servo motor 81 is permitted to drive through an angle equal to the known local magnetic variation following the initial nulling of the output of flux valve 133. During this drive, the output of tachometer 262 is connected to the input of integrator 233 and contact 237 of switch S3 is closed to provide a feed back of the servo motor drive angle.

The Multi-Loop control System

Figure 7:
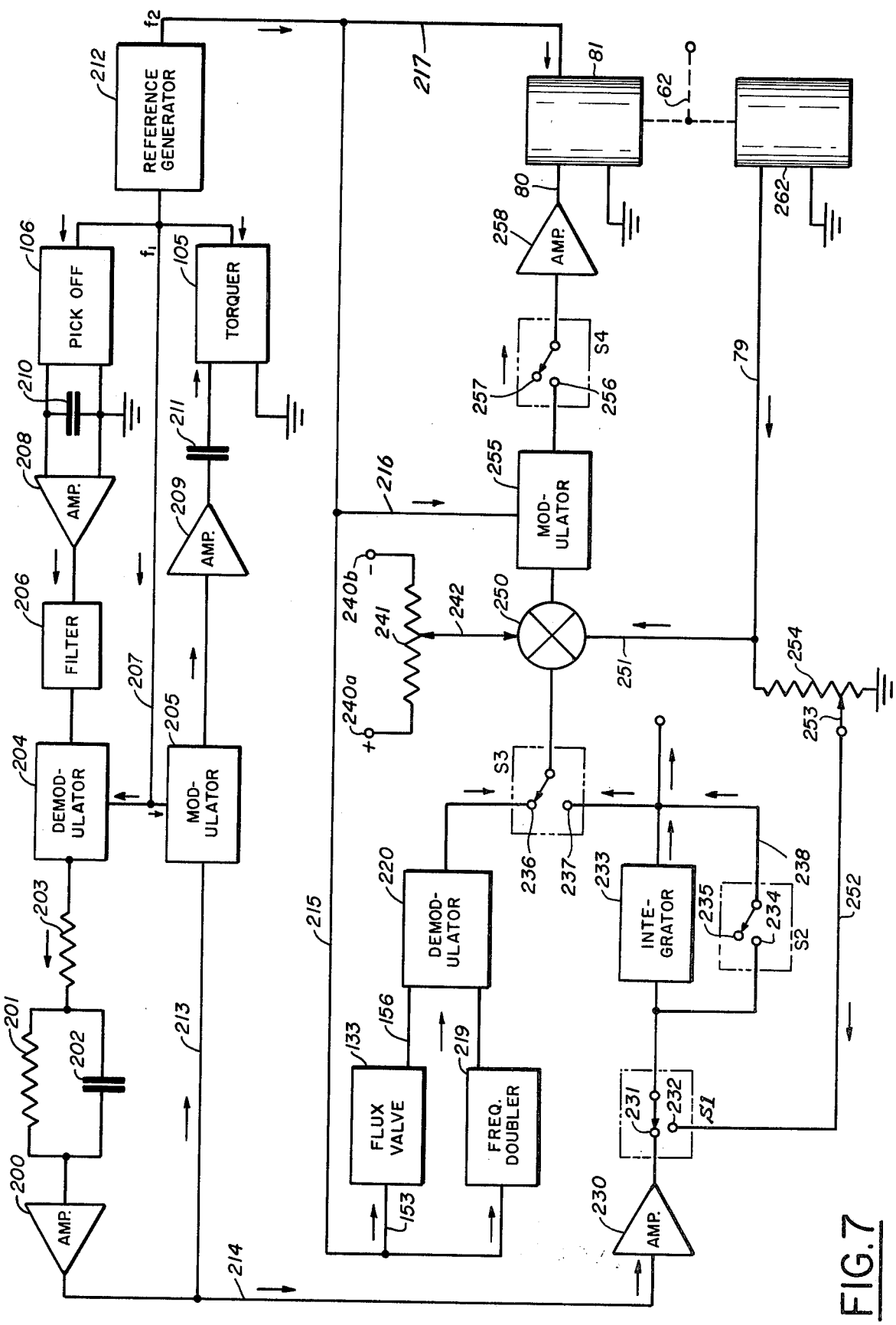
FIG. 7 is a diagram showing electrical components and their interconnections for the dual-loop servo system employing the apparatus of the preceding figures for initial flux valve alignment of the gyroscope, followed by final gyrocompassing alignment of the sensitive instrument.

Flux valve 133, torquer 105, and pick off 106 are cooperatively employed in the multi-loop control system of FIG. 7 for operating servo motor 81, also shown in FIG. 2. Motor 81, as previously described, is adapted to reposition the the follow-up container 104, 112 and, therefore, the pick off elements 106 and torquer elements 105. For this purpose, the oscillator or reference generator 212 of FIG. 7 provides an alternating current excitation signal to pick off device 106. The alternating error output of the latter device is coupled at its output terminals across capacior 210 to the high input impedance alternating current amplifier 208, whose output is filtered by narrow band filter 206 before supply to demodulator 204. A second or reference input to demodulator 204 is that output of reference generator 212 supplied via lead 207 to demodulator 204 as a reference signal for converting the error signal output of filter 206 into a reversible polarity, direct current error signal.

The output of demodulator 204 is supplied through resistor 203 to a signal-shaping network consisting of resistor 201 and capacitor 202 disposed in parallel. The output of the shaping network is supplied through direct current amplifier 200 via lead 213 to a modulator 205 and also via the branching lead 214 to apparatus yet to be described. The direct current signal input to modulator 205 is converted into an alternating signal by virtue of the supply of the reference output of oscillator 212 via lead 207 to modulator 205. The converted alternating signal is supplied to the low output impedance power amplifier 209, whose amplified alternating signal output is coupled by capacitor 211 to the input terminal of device 105 of FIG. 3. There is thus formed a first or inner servo loop which controls the dynamics between the floated element and the follow-up housing, shaping network 201, 202 aiding its operation by providing fast settling and good stability. Input terminals of torquer device 105 are also supplied with the same output of reference generator 212 as is used to excite device 106, demodulator 204, and modulator 205.

For operation of servo motor 81 in the second or outer servo loop for driving the follow-up container reference to alignment with north, the shaped direct current error signal output of amplifier 200 is supplied via lead 214 to low pass amplifier 230 whose output, in turn, is coupled to a conventional integration circuit 233 by switch S1 when the latter contacts terminal 231. Switches S1, S2, S3, and S4 are represented in the figure as simple mechanical switches for the sake of clarity, but it will be understood that well known electronic switches, including transistor switches, may readily be used in performing the functions of the switches. For convenience, however, they are illustrated as ordinary mechanical switches. Accordingly, when switch S1 is conducting through the path including terminal 231, the error signal is coupled through integrator 233 and by terminal 237 to a conventional summation circuit 250. Coupled around integrator 233 is a short-circuiting path 238 which may be closed or open depending upon whether or not the conducting path of switch S2 is complete or broken (terminals 234 or 235). The signal on terminal 237 and any signal on lead 251 may be added algebraically when switch S3 is closed in summation device 250 and are supplied as a direct current signal to modulator 255, also supplied with a reference signal via leads 215 and 216 from reference generator 212. Any alternating output of modulator 255 is supplied when switch S4 is conducting with respect to terminals 256, 257 through a conventional power amplifier 258 and input lead 80 to drive servo motor 81. It is seen that servo motor 81 is coupled to shaft 62 also illustrated in FIG. 2. It is understood, of course, that the slip clutch and limit stop system illustrated in FIG. 2 may readily be included in the structure.

Directly linked to the rotor of motor 82 is the rotor of a conventional tachometer 262 that produces, for example, a direct current output having an amplitude proportional to the speed of rotation of motor 81. This is supplied by lead 79, also seen in FIG. 2, as a direct current signal to the previously mentioned second input 251 of summation device 250. The output of rate generator 262 is also coupled via lead 79 across potentiometer 254. This potentiometer acts as a function generator and has a tap 253 which may be set when the operator adjusts knob 21 of FIG. 1 according to the cosine of the local latitude at which the surveying operation is being conducted. Thus, the rate generator signal modified by the cosine of local latitude is supplied by lead 252 to a second terminal 232 of switch S1. It will be understood that servo motor 81 is supplied with appropriate fixed-phase field excitation in the conventional manner via lead 217 from reference generator 212. This reference frequency $f_2$ is not necessarily the same as the reference frequency $f_1$ used by pick off 106 and torquer 105 and may be a relatively lower frequency, such as 400 cycles per second.

In one mode of operation of the system, error signals developed from the output of pick off 106 are not directly used in operating torque motor 81. Instead, the control of motor 81 is primarily exercised by flux valve 133. For this purpose, the frequency $f_2$ output of reference generator 212 is supplied as an excitation voltage to the continuous coil 152 of flux valve 133. Since an error signal is to be derived from the double frequency ($2f_2$) output of flux valve 133, phase detection with respect to a reference sine wave of frequency $2f_2$ is required; for this purpose, the $f_2$ signal on lead 215 is also applied to frequency doubler 219. Accordingly, demodulator 220 serves to generate a d.c. error signal from the outputs of flux valve 133 and of frequency doubler 219. Accordingly, the signal on terminal 236 of switch S3 is a variable polarity, variable amplitude error signal analogous to that on terminal 237 of the same switch, but actually representing a flux-valve generated error signal.

System Operation

Operation of the inner loop shown in the upper part of FIG. 7 and the interplay between the torquer and centering devices 105 and 106 will be apparent from the foregoing discussion, it being understood that the novel surveying device is, as in FIG. 1, first placed on a tripod and is leveled using bubble level 8. Also, the latitude correction is set in by operating knob 21. After the flux valve null is provided and gyroscope rotor 110 is run up to operating speed, the floated assembly is automatically centered by means not shown and forming no particular part of the present invention and devices 105 and 106 are excited by oscillator 212. Any azimuth rotational error between shaft 35 and gyroscope 110 is at once detected and an error signal is supplied by pick off 106 to excite torquer 105 promptly to reduce the error substantially to zero. Consequently, the spin axis of gyroscope rotor 110 is also oriented in an approximately northern direction and the floated element accurately tends to remain precisely at the azimuth position of the follow-up container element because of the feed back action in the inner loop. Any perturbing effect of gyroscope 110 is used in the outer loop of FIG. 7 to reorient the follow-up system so that it is also finally aligned to true north. Any persistent error signal that appears on lead 214 is used, as will be further described, to torque shaft 62 toward alignment with north and, as a consequence, to move the selsyn elements 36, 37 of FIG. 2 and the follow-up container itself to the northerly alignment. As will be described, the rotation to north may be advantageously accomplished according to one mode of operation in steps, the follow-up container being driven in an iterative fashion to the azimuth angle where no average torque is required to maintain alignment between the floated assembly and the follow-up container, the spin axis of rotor 110 then being oriented toward north. At the completion of all of the steps of the invention, the outer loop servo operating servo motor 81 is locked and the inner feed back loop provides only damping.

Figure 10:
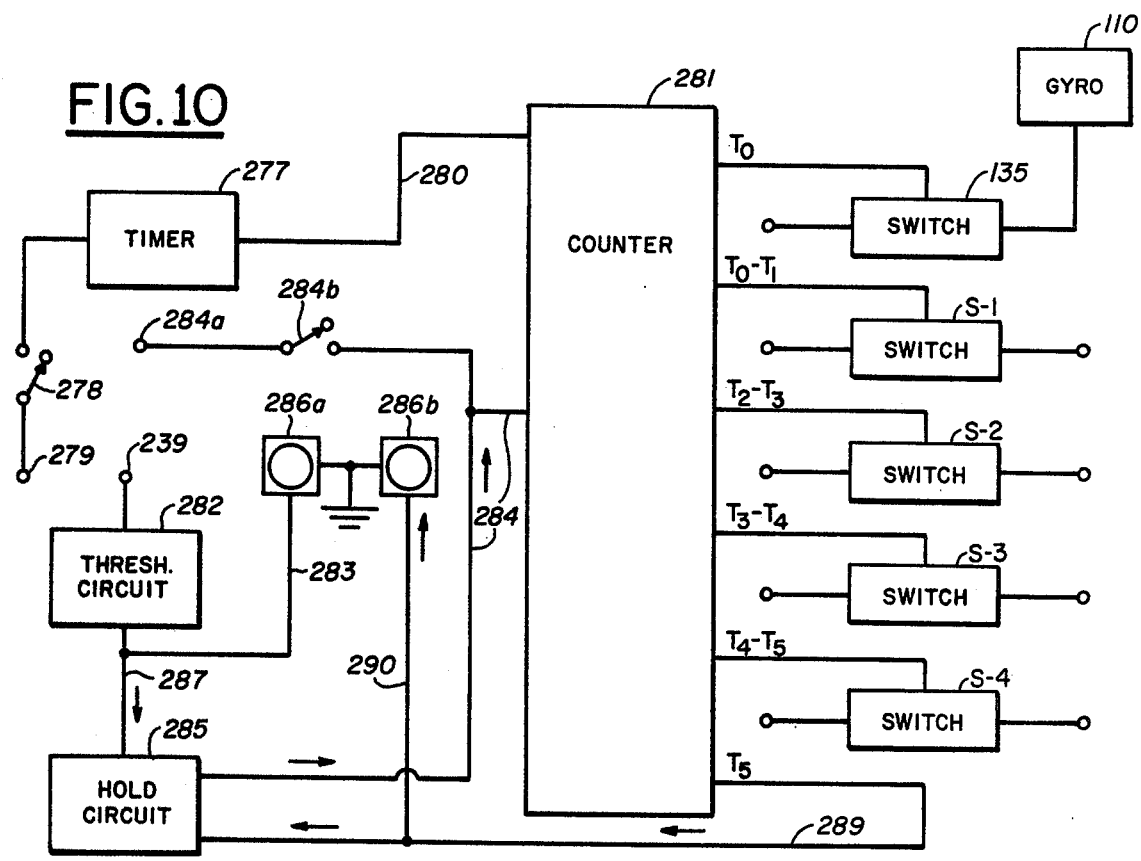
FIG. 10 is a wiring diagram of a switching timer arrangement for controlling switches of FIG. 7 according to the program illustrated in FIGS. 8 and 9.

FIGS. 8, 9, and 10 will be used in explaining the several modes of operation of the outer loop according to the status of switches S1, S2, S3, and S4. In FIG. 8, the power for exciting the instrument is switched on at time $T_0$ by closing switch 278 (FIG. 10) to admit power from terminal 279 so that during the period ending nominally at time $T_2$, the rotor of gyroscope 110 is run up to its normal operating speed and thereafter remains at that speed. Starting at the same time $T_0$, flux valve 133 is excited and its output is used to drive motor 81 and thus to null the reference azimuth position of gyroscope 110 with respect to the flux valve output. At time $T_2$, the inner loop of the positional control system is permitted to settle, which operation ends at time $T_3$. Integration is performed between times $T_3$ and $T_4$. The result of the integration process is used to drive servo motor 81 in the interval between times $T_4$ and $T_5$. Normally, the servo motor drive signal is removed at time $T_5$ and the desired angular output appearing on display 19 of FIG. 1 is sufficiently accurate to be read by the observer. However, in the event that the integrated signal derived in interval $T_3$ to $T_4$ is larger than a predetermined value, a number having unsuitable accuracy would appear on display 19. With such a large integrated output signal, the system is caused to recycle, repeating the settle, integrate, and drive processes. Although several such recycling events could, in theory, be required, it is in practice found according to the invention that normally only one recycling is required, and that the need for even one recycling is unusal. In this manner, it is seen that the instrument quickly yields the required precise angle data. While it will be readily apparent that the aforementioned periods of operation will vary with different designs of the apparatus, one representative set of times is as follows:

|             | Minutes | Seconds |
| ----------- | ------- | ------- |
| $0 - T_1$   | 0       | 50      |
| $0 - T_2$   | 1       | 0       |
| $T_2 - T_3$ | 1       | 0       |
| $T_3 - T_4$ | 1       | 0       |
| $T_4 - T_5$ | 0       | 5       |

To effect the stepped operation, switches S1, S2, S3 and S4 are programmed as in FIG. 9 by a timing control arrangement such as shown in FIG. 10. Timer 277 is a timer micro-circuit readily available on the market, as is counter and logic circuit 281 driven by timer 277. Counter 281 operates in a conventional manner to supply time switching signals to switch 135 of FIG. 10 and to the outer loop switches S1, S2, S3, and S4. The timer control combination illustrated in FIG. 10 operates to open and close the several switches according to the program in the table of FIG. 9. It will be understood that the electronic switching system of FIG. 10 is generally the equivalent of motor driven slip-ring switching devices of entirely conventional nature, mechanical devices any of which could readily be substituted at least in part for the timer system represented in FIG. 10.

As previously observed, the timer system of FIG. 10 is equipped to recycle the operation of the system when the output at terminal 239 in FIG. 7 is found undesirably to be greater than a predetermined value. For this purpose, terminal 239 is coupled to a conventional threshold circuit 282 of the type yielding a finite output on lead 287 when its input is excessive; the signal on lead 287 is coupled to the conventional bistable hold circuit 285, which circuit retains the input signal until a clearing pulse arrives on lead 289 at time $T_5$ from counter 281. The clearing pulse clears hold circuit 285 and causes it to supply a re-set pulse via lead 284 to the $T_2-T_3$ stage of counter 281. In this manner, counter 281 is cycled to cause switches S2 through S4 successively to operate again, causing a repetition of the settle, integration, and azimuth driving events. If the flux valuve coercion mode is to be skipped, the operation going directly from gyro rotor run-up to the gyrocompassing mode, closure of switch 284b will produce this desired cycle of events.

Visual evidence of the fact that the output of threshold circuit 282 is too large may be furnished by coupling that output via lead 283 to a conventional lamp or other indicator 286a, which may include suitable amplification and other display circuits. Visual evidence of the fact that the output of threshold circuit 282 is too high at time $T_5$ may be provided by coupling lead 289 from the last stage of counter 281 via lead 290 to a similar display 286b arranged directly beside of display 286a. Upon observation that both displays 286a and 286b are illuminated, the operator may depress switch 284b to connect a reset voltage available at terminal 284a to lead 284 so that the latter stages of counter 281 are appropriately reset and recycled. Thus, either automatic or operator-initiated recycling of the loop may be exercised.

Referring to FIGS. 7, 9, and 10, the switches S1, S2, S3 and S4 associated with the outer loop are set in particular positions during the run up of the rotor of gyroscope 110. Switch S3 contacts terminal 236, so that the demodulated output of flux valve 133 is coupled through summing device 250 to modulator 255. Converted to an alternating current signal, the flux valve signal is then coupled through the closed switch S4 and power amplifier 258 to servo motor 81. The rate feed back from rate generator 262, also driven by motor 81, is supplied to summing circuit 250 in the usual manner. The follow up container 104, 112 is thus driven by motor 81 through shaft 35 to a position roughly dictated by the earth's field signal generated by flux valve 133. In the meantime, the inner loop, through the action of pick off 106 and torquer 105, follows the motion of the follow up container 104, 112. With the instrument tripod originally set up with only rough accuracy and if the local magnetic variation is known and is set in by operator adjustment of dial 139 in FIG. 3, the flux valve 133 will, during this step, move the gyroscope 110 axis 114 very close to the desired true north orientation.

At time $T_1$, the action of flux valve 133 is ended by the transfer of switch S3 from terminal 236 to terminal 237. At this time, the diminished output of pick off 106 remains available at the output of amplifier 230. Then, switch S1 contacts terminal 231, switch S2 is closed, and switch S4 is open. During the settling period, switch S1 contacts terminal 231, switch S2 is closed, and switch S4 is open. During the integration interval, switch S1 contacts terminal 231 and switches S2 and S4 are both normally open. When servo motor 81 is being driven, switch S1 contacts terminal 232, switch S2 is open, and switch S4 is closed. Finally, after the successive steps have been completed and the display 19 to be read, switch S1 contacts terminal 231, switch S2 is closed, and switch S4 is open.

At the time of the reading of the display 19, the apparatus of FIG. 11 may be employed. It will be understood that the data transmission section 5 of FIG. 2 then feeds selsyn angular position information to a conventional data transmitter-to-digital converter 300 which supplied operating signals in any conventional manner via the bundle 301 of electrical leads to a conventional display 302. The latter will then supply a direct reading in numeric symbols on read-out 303 of the angle between shaft 35 and the azimuth setting of telescope 1, used by the operator in the normal manner, for instance, to measure target angles with respect to true north.

With respect to FIGS. 8 and 9 and the operation of the outer loop of FIG. 7 during the settling mode of the apparatus, it will be seen that the error output on lead 214 passes through switch S1 and integrator 233, but switch S4 is open so that motor 81 is not driven. At the start of the integration period, switch S1 still provides a current path to integrator 233. Switch S2 remains closed only momentarily to ensure that integrator 233 remains positively reset to zero at the very start of the integration period, but is then opened so that the integration function is now performed. Again, switch S4 is open and outer loop servo motor 81 is not driven. The resultant integrated output is a measure of the departure of the spin axis 114 of gyro rotor 110 with respect to true north.

During the drive modes of operation, the input error signal is disconnected, since switch S1 is moved to terminal 232, breaking the input path of error signal flow. Switch S2 remains open. Of significance also is the fact that switch S4 is made conducting, passing the integrated signal through amplifier 258 to servo motor 81, causing it to drive shaft 62. Operation of servo motor 81 also produces a rate signal output on lead 79 of rate generator 262 which is added algebraically to the output of integrator 233. The rate signal on lead 79 is further fed through latitude potentiometer 254 back into the input of integrator 233. Operation of servo motor 81 is thus automatically continued until the output of integrator 233 is driven to zero by the output of generator 262. The resultant drive angle is made accurately equal to the measured angle from north by conventional scaling so that the initial north pointing error is reduced to zero.

The principles involved in the iterative operation may be explained in a further simple manner. Consider that gyroscope rotor 110 is located at a local latitude $\lambda$ with its spin axis at an angle $\theta$ with respect to true geographic north. If the axis is to continue that orientation, it will be understood that, because of the rotation of the earth, there must be maintained a torque on the rotor about the vertical axis given by:

$$T = \Omega H \cos\lambda \sin\theta$$

Where H is the angular momentum of the rotor and $\Omega$ is the earth's rotation rate. In the actual embodiment of the instrument, use is made of the equation by a mechanization in which a pendulous gyroscope is kept pointing in a fixed direction by application of the required torque about the vertical axis. This torque is a measure of the angle of the rotor spin axis away from north and the gyroscope can be rotated through this error angle to bring it to north. Because the relationship between rate and angle contains the factor $\cos \lambda$, there must be a correction made for the value of latitude.

It is evident that for large values of the angle $\theta$, the allowable percentage error in making measurements must be very small if the final pointing error is to be small. Also, there must be a correction for the fact that the torque is proportional to $\sin \theta$ and not directly to $\theta$. As an example, if the initial value of $\theta$ is 30°, a final pointing error of one half minute would require an overall accuracy of about 0.03 percent; this would be very expensive to attain and would require very high accuracy in setting in the latitude value. To overcome this difficulty, the present invention greatly reduces the initial pointing error by using flux value coercion of the gyroscope azimuth angle error toward zero during the period that the gyroscope rotor is broght up to speed. In this manner, normally only one of the possible iterative driving episodes is required to position the gyroscope with final accuracy, rather than the three episodes characterizing the invention of the aforementioned U.S. Pat. application Ser. No. 621,907. However, so as to assure final precise settling of the gyroscope axis even under the extreme condition in which initial error is large, the possible modes of operation automatically includes at least two successive iterative episodes, each episode involving settling, integration, and driving, following the initial drive by the output of the flux value.

Thus, the flux valve output provides roughly accurate positioning of the gyroscope in the time that was formerly used only to bring the gyroscope rotor up to speed, the inner loop of the system having electronically roughly stabilized the floated assembly in the same interval. While the follow up container will not at this time be precisely oriented with respect to north, the switching system now successively switches the outer loop into settling, integrating, and drive modes which normally, without the repetition required in application Ser. No. 621,907, position the gyroscope spin axis with fully acceptable accuracy.

At the instant that the timing circuits switch the outer loop to the drive mode, the output of integrator 233 is modulated (255) by the reference sine wave and the input lead to integrator 233 is switched to the output of genrator 262. Motor 81 therfore drives shaft 62 through an angle proportional to the charge initially stored during the integration made within integrator 233. The effective gain of the feed back loop is adjusted by the setting of tap 253 of the latitude potentiometer 254, so that latitude compensation is effected quite adequately, even though the correction set in manually is normally only an approximate one. The minor noise signals present in the system are reduced in effect also by the integration process, whereby the measured torque is averaged over a sufficient period of time to reduce the effect of the noise signals to an acceptable low level and so that the result of integration is accurately a measure of angle $\theta$.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A gyroscopic compass comprising:
    support means including external casing means,
    follow-up container means within said external casing means journaled for rotation about a normally vertical axis,
    floated gyroscopic assembly means within said follow-up container means buoyantly supported only by liquid contained within said follow-up container means,
    gyroscope rotor means journaled about a normally horizontal axis within said floated gyroscopic assembly means,
    angle pick-off means responsive to the difference between the azimuth position of said floated gyroscopic assembly means and said follow-up container means for developing a first control signal at output terminals thereof,
    torquer means responsive to said first control signal for continuously repositioning said floated gyroscopic assembly means to decrease said difference substantially to zero,
    flux valve means supported by said follow-up container means for providing a second control signal at output terminals thereof,
    motive means selectively responsive to said first or second control signal for driving said followup container means,
    sighting means journaled for free rotation with respect to said follow-up means, and
    display means responsive to the difference between the azimuth position of said follow-up container means and said sighting means.

2. A gyroscopic compass as described in claim 1 additionally including adjustable means for selectively positioning in azimuth said flux valve means with respect to said follow-up container means for compensating said second control signal for the azimuthal magnetic deviation of the earth's magnetic field.

3. A gyroscopic compass as described in claim 2 additionally including;
    timer means,
    first switch means responsive in a first mode of operation of said gyroscopic compass to said timer means for selectively coupling only said second control signal to said motive means during a first predetermined time period,
    second switch means additionally responsive to said timer means during at least a portion of said first predetermined time period for driving said gyroscope rotor means up to its normal operating speed, thereafter maintaining said speed.

4. A gyroscopic compass as described in claim 3 wherin said first switch means is additionally responsive after said first predetermined time period for selectively coupling only said first control signal to said motive means.

5. A gyroscopic compass as described in claim 3 additionally including:
    first demodulator means responsive to said angle pick-off means,
    parallel resistor-capacitor shaping network means responsive to said first demodulator means, and
    first modulator means for providing a modulated signal in response to said shaping network means,
    said torquer means bein responsive to said modulated signal.

6. A gyroscopic compass as described in claim 5 including reference generator means for supplying a first phase-reference signal for said first demodulator means and to said first modulator means and for excitation of said torquer means and said pick-off means.

7. A gyroscopic compass as described in claim 5 further including:
    integrator means,
    third switch means under control of said timer means and having a first input terminal for selectively coupling the output of said signal shaping network means to said integrator means, fourth switch means under control of said timer means for resetting said integrator means, second modulator means responsive to said integrator means, and fifth switch means under control of said timer means for selectively coupling the output of said second modulator means to said motive means.

8. A gyroscopic compass as described in claim 7 further comprising:

rate signal generator means responsive to said motive means for supplying a rate signal output, summation means having a first input responsive to said integrator means, an output coupled to said second modulator means and a second input, said rate signal output being coupled to said second input, and function generator means for modifying said rate signal output by a function of local latitude for application to a second input terminal of said third switch means for selective application to said integrator means.

9. A gyroscopic compass as described in claim 8 wherein said reference generator means further provides a second phasereference signal to said second modulator means and to said motive means 10. A gyroscopic compass as described in claim 8 wherein said timer means is adapted, during a settling mode of operation of said gyroscopic compass, for actuating said means for resettling said integrator means for a second predetermined time period.

11. A gyroscopic compass as described in claim 10 wherein said timer means is further adapted, during an integration mode of operation of said gyroscopic compass following said settling mode, for deactivating said inegrator resetting means and for causing said integrator means to integrate the output of said signal shaping network means for a third predetermined time period for developing an integrated output signal.

12. A gyroscopic apparatus as described in claim 11 wherein said timer means is further adapted, during a driving mode of operation of said gyroscopic compass following said integration mode, and for a fourth predetermined time period, for:

rendering said fifth switch means conductive for coupling said integrated output signal for driving said motive means, and operating said third switch means for coupling only said second terminal of said third switch means for supply of the output of said function generator means to said integrator means.

13. A gyrsocopic compass as described in claim 12 wherein said timer means is further adapted to cause said gyroscopic compass means to repeat at least once settling, integration, and driving modes of operation in fifth, sixth and seventh predetermined periods of time succeeding said fourth predetermined time period.

14. A gyroscopic compass as described in claim 13 further including:

threshold circuit means responsive to said integrator means during said integration mode for producing a recycle command signal only when said integrator means output exceeds a predetermined value, timing pulse generator means, counter means responsive to said timing pulse generator means for producing control outputs at said predetermined time periods, said control outputs respectively controlling the the state of conduction of said first, second, third, fourth, and fifth switch means at said predetermined time periods, said counter means being responsive to said recycle command signal for recycled operation of said third, fourth, and fifth switch means for causing said gyroscopic compass means to repeat said settling, integration, and driving modes of operation.

15. A gyroscopic compass as described in claim 13 further including:

timing pulse generator means, counter means responsive to said timing pulse generator means for producing a sequence of output signals at respective counter output means for controlling said respective first, second, third, fourth, and fifth switch means, threshold circuit means responsive to said integrator means only when said integrator means output exceeds a predetermined value for producing a recycle command, sample and hold circuit means for passing said recycle command at the end of said fifth predetermined period of time, and circuit means for coupling said recycle command at the end of said fifth predetermined period of time to recycle said counter means for causing said gyrsocopic compass means to repeat said settling, integration, and driving modes of operation.

* * * * *